(12) United States Patent
Zlotopolski

(10) Patent No.: US 7,491,298 B2
(45) Date of Patent: Feb. 17, 2009

(54) PLANT FOR PRODUCING LOW DEUTERIUM WATER FROM SEA WATER

(76) Inventor: Vladimir Z. Zlotopolski, 7675 Via Cristal, Unit # 3, San Diego, CA (US) 92129

(*) Notice: Subject to any disclaimer, the term of this patent is extended or adjusted under 35 U.S.C. 154(b) by 511 days.

(21) Appl. No.: 10/723,563

(22) Filed: Nov. 25, 2003

(65) Prior Publication Data

US 2005/0109604 A1 May 26, 2005

(51) Int. Cl.
*B01D 3/02* (2006.01)
*B01D 7/00* (2006.01)
*C02F 1/14* (2006.01)
*C02F 1/44* (2006.01)
*C25B 1/04* (2006.01)

(52) U.S. Cl. .......... 203/10; 159/903; 159/904; 159/DIG. 27; 159/DIG. 28; 202/200; 202/202; 202/234; 203/DIG. 1; 205/343; 210/640; 429/12

(58) Field of Classification Search ......... 159/903, 159/904, DIG. 15, DIG. 27, DIG. 28; 202/200, 202/202, 234, 267.1; 203/10, 86, DIG. 1; 205/343; 210/640; 429/12
See application file for complete search history.

(56) References Cited

U.S. PATENT DOCUMENTS

| | | | | |
|---|---|---|---|---|
| 4,478,685 A | * | 10/1984 | Mortenson | 202/158 |
| 4,714,525 A | * | 12/1987 | Spevack | 203/10 |
| 5,005,787 A | * | 4/1991 | Cullingford | 244/171.7 |

* cited by examiner

*Primary Examiner*—Virginia Manoharan
(74) *Attorney, Agent, or Firm*—John R. Ross

(57) ABSTRACT

A plant and process for efficient production of low deuterium water from seawater. The plant includes a solar still with a black pan for collecting solar heat, that vaporizes portions of the seawater and a porous sloped membrane positioned over the black pan to collect and condense the vapor and to direct the condensate via gravity to a condensate tank. The condensate water is separated into its atomic components, hydrogen and oxygen, in an electralizer; then the hydrogen and oxygen are combined in a reactor to produce heat and low deuterium water. In preferred embodiments the reactor is a fuel cell which in addition to the heat and water also produces electricity. At least a portion of the heat produced in the reactor is used in the solar still to assist in the vaporization of the seawater and to greatly increase the efficiency of the still.

10 Claims, 4 Drawing Sheets

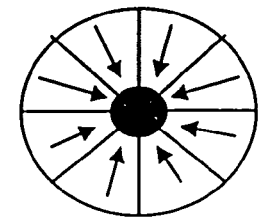
FIG. 3B
FIG. 3A
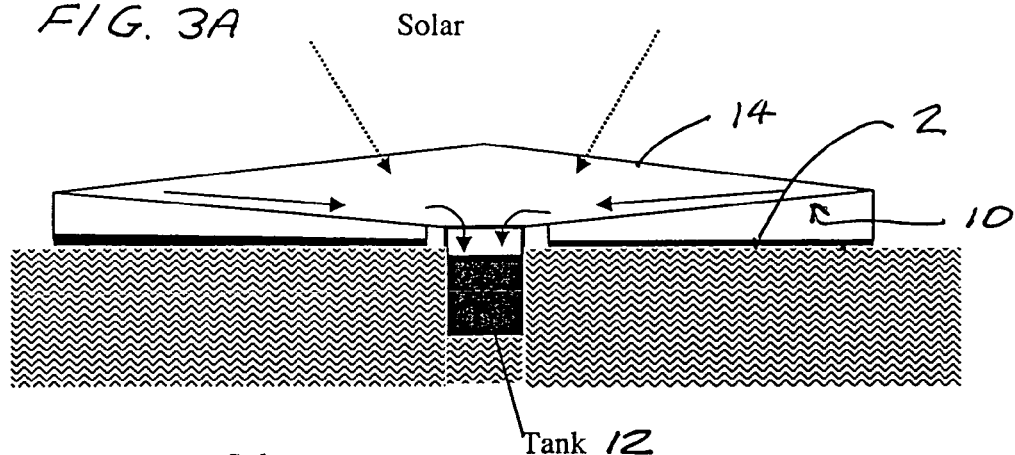
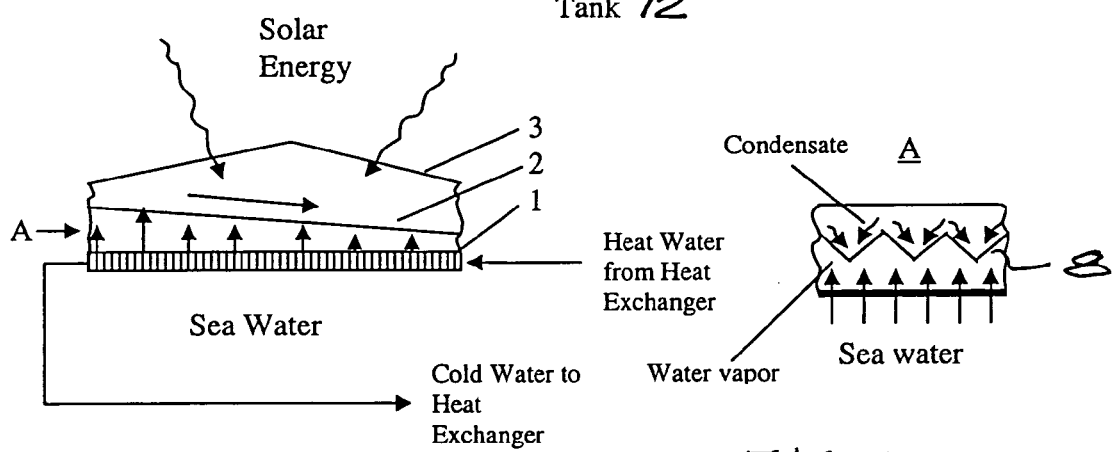
FIG. 2A
FIG. 2B
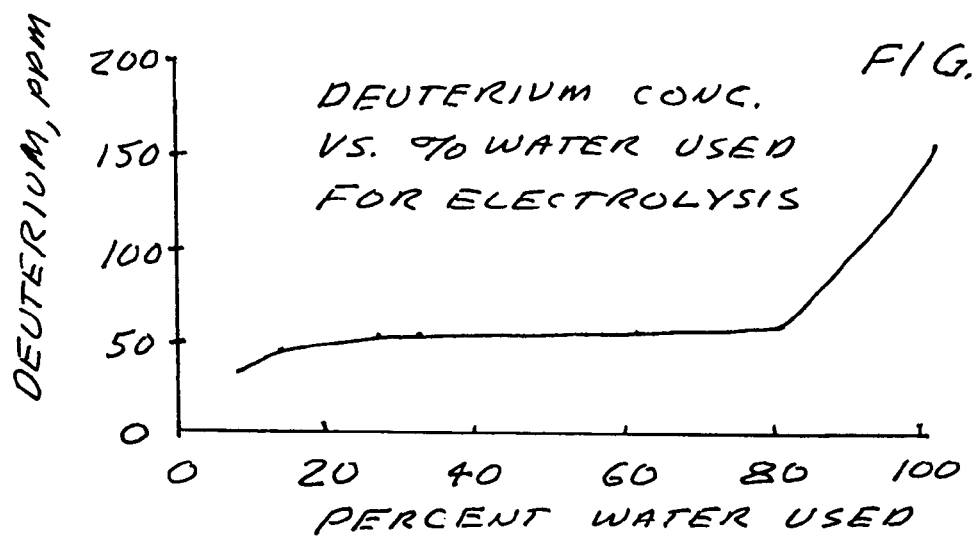
FIG. 4

PLANT FOR PRODUCING LOW DEUTERIUM WATER FROM SEA WATER

This invention relates to water desalination plants and methods and in particular to plants and methods for making drinking water.

BACKGROUND OF THE INVENTION

There is substantial evidence that deuterium in drinking water can be detrimental to good health. For example, there is evidence that high concentration of deuterium in water (heavy water) leads to the loss of activity and to varies diseases in higher animals and studies indicate that alga ceases the growth and development when suspended in heavy water. Studies have also shown an increase in the rate of photosynthesis of plants and increased efficiency on gaining of biomass with the use of low deuterium water as compared to control groups using standard water.

The concentration of heavy water in standard water is 150-160 ppm. Decreasing of the deuterium concentration influences biological activity of the water. Studies indicate that decreasing of deuterium from 150 to 50 ppm leads to a 40% increase in growth of Japanese quails. Other studies have indicted that seed production of the plants can increase as much as on 56% with the use of low deuterium water.

A prior art method of deuterium-free water production is based on electrolysis of distillate water. Separation by electrolysis is based on differences between ions mobility coefficients. Mobility coefficients for $H^+$ is 349.8 cm $v^{-1}s^{-1}$ for $D^+$ is 250.1 cm $v^{-1}s^{-1}$, for $OH^-$ is 197.6 cm $v^{-1}s^{-1}$ and for $OD^-$ is 119.0 cm $v^{-1}s^{-1}$. The theoretical coefficient of electrochemical achieves a factor of seven decrease in deuterium concentration. The method is very expensive as electrolysis is a high power consumption technology.

The prior art includes a number of methods for producing potable water from seawater by desalination. Practically all methods are very heavy energy consumers except desalination by using solar energy. These systems are called solar stills. These stills include an evaporator having a roof made of a light-penetrable material, and an underlying black basin containing the water that is to be evaporated. Water vapor is condensed on the inside of the roof and flows down to the reservoir for the condensed water. The roof can be made from glass or plastic material. The efficiency of a system of this type is determined by the heat utilized to vaporize the water collected divided by the solar heat collected by the system.

What is needed is a system and process to produce low deuterium water from seawater.

SUMMARY OF THE INVENTION

The present invention provides a plant and process for efficient production of low deuterium water from seawater. The plant includes a solar still with a black pan for collecting solar heat, that vaporizes portions of the seawater and a porous sloped membrane positioned over the black pan to collect and condense the vapor and to direct the condensate via gravity to a condensate tank. The condensate water is separated into its atomic components, hydrogen and oxygen, in an electralizer; then the hydrogen and oxygen are combined in a reactor to produce heat and low deuterium water. In preferred embodiments the reactor is a fuel cell which in addition to the heat and water also produces electricity. At least a portion of the heat produced in the reactor is used in the solar still to assist in the vaporization of the seawater and to greatly increase the efficiency of the still.

BRIEF DESCRIPTION OF THE DRAWINGS

FIGS. 2A and 2B are drawings showing a solar still.

FIGS. 3A and 3B are drawings showing a method of the condensate collection.

FIG. 4 is a drawing showing the dependence of deuterium concentration on the percentage of the water volume used for electrolysis.

DETAILED DESCRIPTION OF PREFERRED EMBODIMENTS

Figure 1:
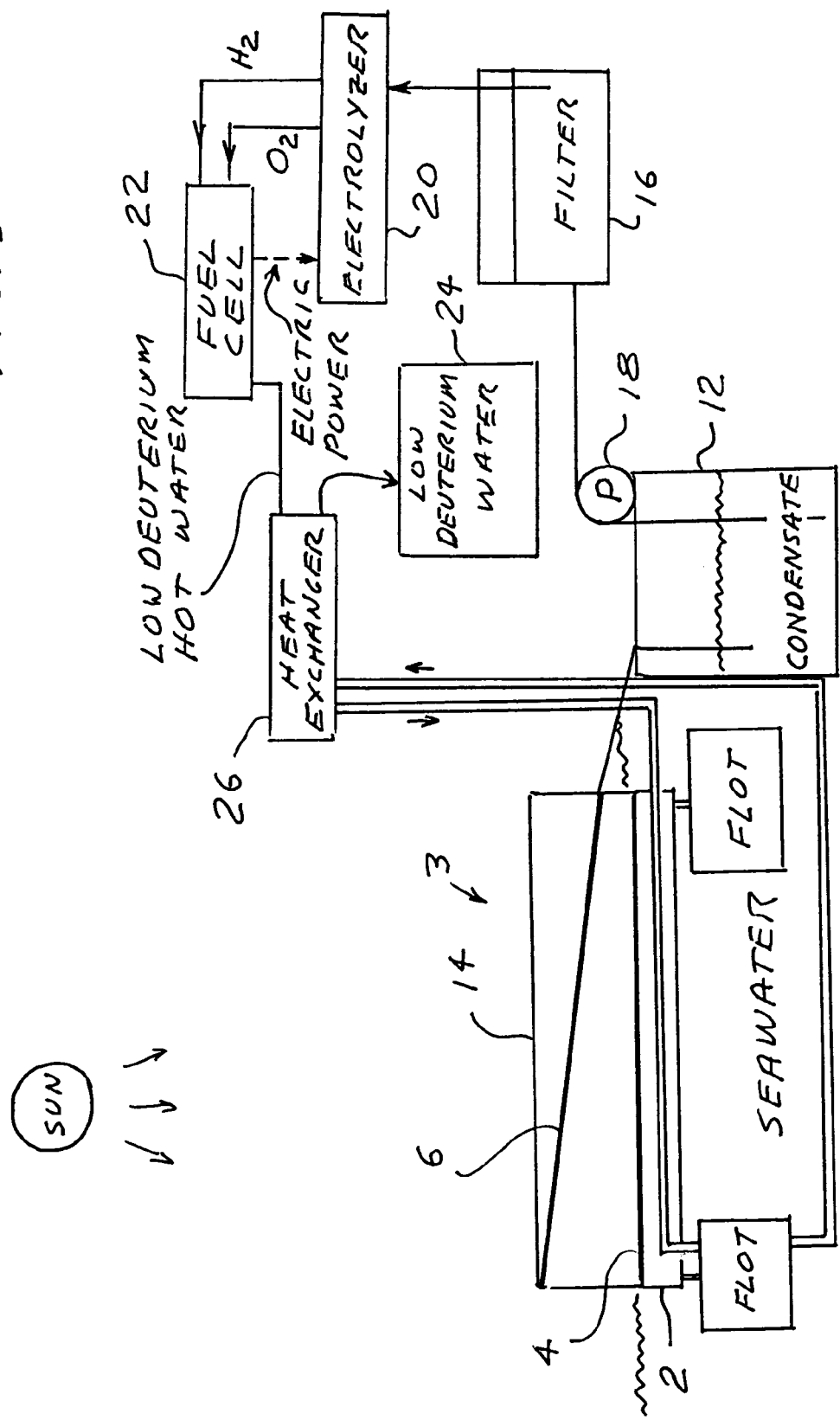
FIG. 1 is a drawing showing the principal outlines of a preferred method for low deuterium water production from seawater.

Preferred embodiments of the present invention may be described by reference to the drawings.

First Preferred Embodiment

A first preferred embodiment of the invention can be used for production of low deuterium water from seawater can be described by reference to FIGS. 1-4. A large flat black porous pan 2, made from polymer micro-porous hydrophilic material and floating on the sea, permits seawater to diffuse through porous pan 2. Water collects as shown at 4 on the top surface of pan 2 and is heated by radiation from the sun passing through membranes 14 and 6. Water is evaporated from surface of the water and the resulting vapor condenses on membrane 6 which is made from micro-porous light-penetrable hydrophilic material and is reinforced with polymer beams. Membrane 6 is several degrees colder than the water vapor. The condensate once collected diffuses through the member from its bottom surface to its top surface. This membrane is made with saw shaped surface as shown at 8 in FIG. 2B. The lower angle part of the membrane is needed for collection of the condensate. Membrane 6 is placed at an angle to sea level as shown at 10 in FIG. 3A allowing the condensate flow in a collecting tank 12. Temperature differences between water collected on the top of pan 2 and membrane 6 determine an energy transfer rate. The water depth on the evaporating surface is important parameter of the solar still efficiency. In this preferred embodiment the water depth is maintained at 0.5 inch or less. At these depths the water evaporates almost immediately after diffusing through the membrane.

To prevent the evaporation of the condensate from membrane 6 and contamination of it by sea water there is the third polymer membrane 14 above the second one. The space between membrane 6 and membrane 14 is hermetically sealed and the space between pan 2 and membrane 6 is open. The open space between porous pan 2 and membrane 6 is needed for periodic washing off of salts from upper surface of porous pan 2 with seawater. The condensate is collected in condensate tank 12. A preferred method of condensate collection is presented on the FIG. 3 where condensate collection tank 12 is placed in the center of a round membrane system.

Process details for production of reduced deuterium water from seawater condensate are shown in FIG. 1. Condensate is pumped through filter 16 by pump 18 and then to electrolyser 20. The electrolysis of the condensate is carried out on 80% of condensate volume. This means that 80 percent of the condensate is separated into hydrogen and oxygen and 20 percent is discharged. In this case the deuterium concentration is about 50 ppm as indicated in FIG. 4. Oxygen and hydrogen produced in electrolyser 20 is directed to fuel cell 22, which is used as a synthesis reactor. The result of the synthesis is water with deuterium concentration reduced from about 150 ppm to about 50 ppm. Electrical energy and heat energy is also produced by the reaction of the oxygen and hydrogen. The low-deuterium water is collected in a tank 24. The electrical energy is used for electrolysis. The heat produced is used for the heating of the black polymer membrane pan 2 of the solar still 3. Heat exchanger 26 is used for recuperation of the heat. A heat carrier (which may be water or other appropriate heat transfer liquid or gas) circulates in the loop 28. Pan 2 preferably includes copper tubes inside running through its membrane material. Recuperated heat from the chemical reaction in fuel cell 22 supplements the solar energy source to provide additional heat and increase the efficiency of the evaporation process.

A catalytic reactor or oxygen-hydrogen burner can be substituted for fuel cell 22. The produced water is free of contaminates as it is manufactured from pure oxygen and hydrogen. Thus, this method is also provides water purification.

Components

Preferred materials and components referred to above are available commercially as described below.

Flat black polymer micro-porous hydrophilic material for pan 2 as shown in FIG. 1 is available from Porex Corporation (Fairburn, Ga. 30213). The sheet grades in the Porex Sheet product line have an average mean pore size in the 7-150 micron range with void volumes of 35-50%. Copper tubes can be used as heating tubes. Micro-porous light-penetrable hydrophilic material for membrane 6 shown in FIG. 3A is available from GE Osmonics, Inc. The material OEM Porestics Polyester (PETE) has pore size 14 micron and pore density $5 \times 10^4$ pores/cm$^2$. Any light-penetrable polycarbonates or acrylics sheet can be used as a micro-porous light-penetrable hydrophobic material for membrane 14. Electrolyser 20 for condensate splitting of the condensate water is available from Stuart Energy System Corp. (5101 Orbitor Drive Mississauga, Ontario L4W 4V1 Canada). Specifications for IMET Electrolysers are: hydrogen output from 1 to 60 Nm$^3$/h, with a purity of gas at 99.997% and power consumption 4.20 KWh/Nm$^3$. An alkaline fuel cell can be used as fuel cell. Preferably pure oxygen is used as the power source. Even small concentrations of $CO_2$ in air affects the efficiency of the fuel cell. In our case we avoid this problem as we use pure oxygen. This type of fuel cells has efficiency in the range of 60-70%. Suitable cells are available from J. Larminie, A. Dicks, Fuel Cell Systems. Alkaline fuel cells are available from companies such as ZeTek Power Plc (UK) and Astris Energi Inc. (USA).

Second Preferred Embodiment

Figure 5:
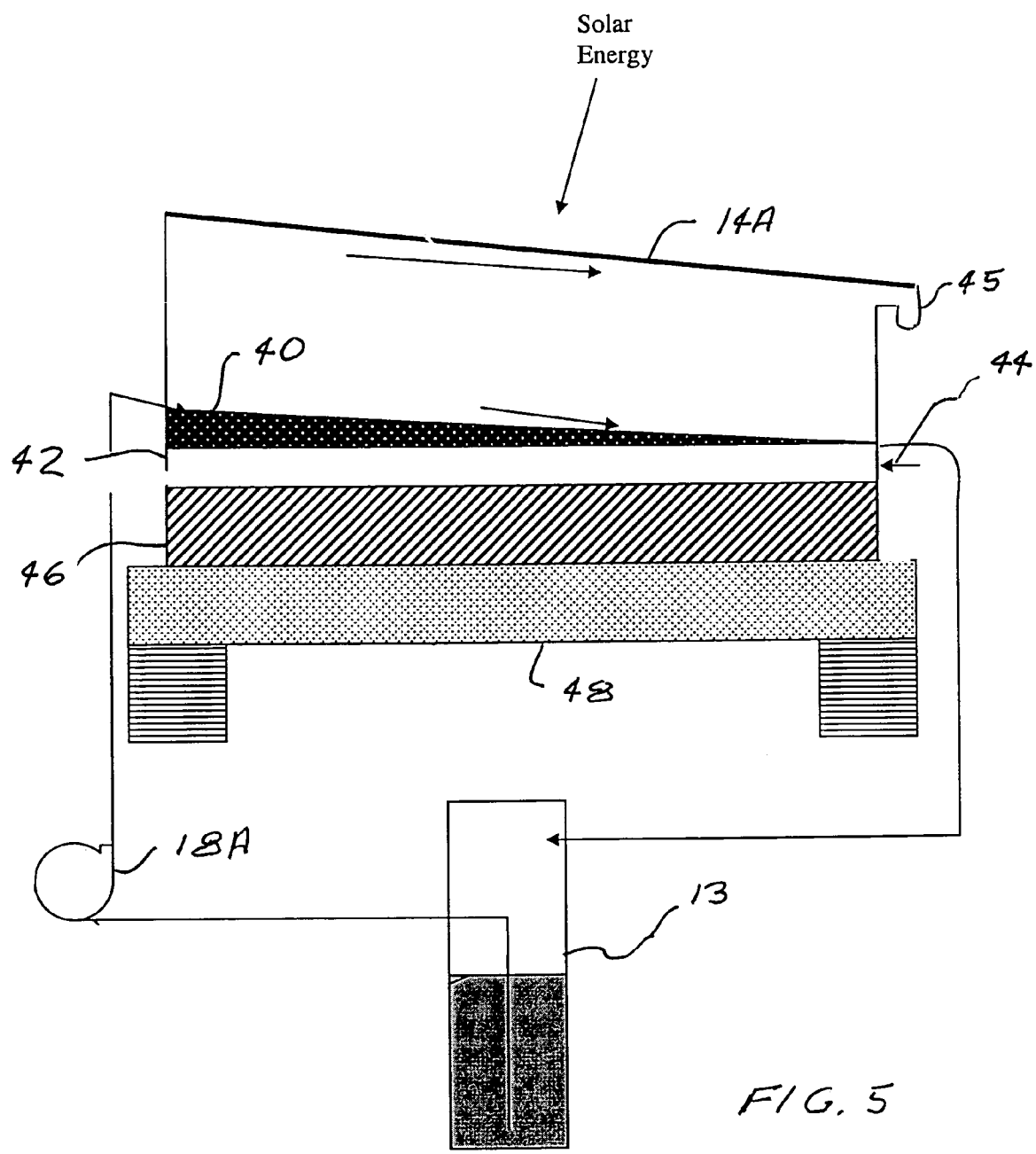
FIG. 5 is a drawing showing a solar still with ground placement.
Figure 6:
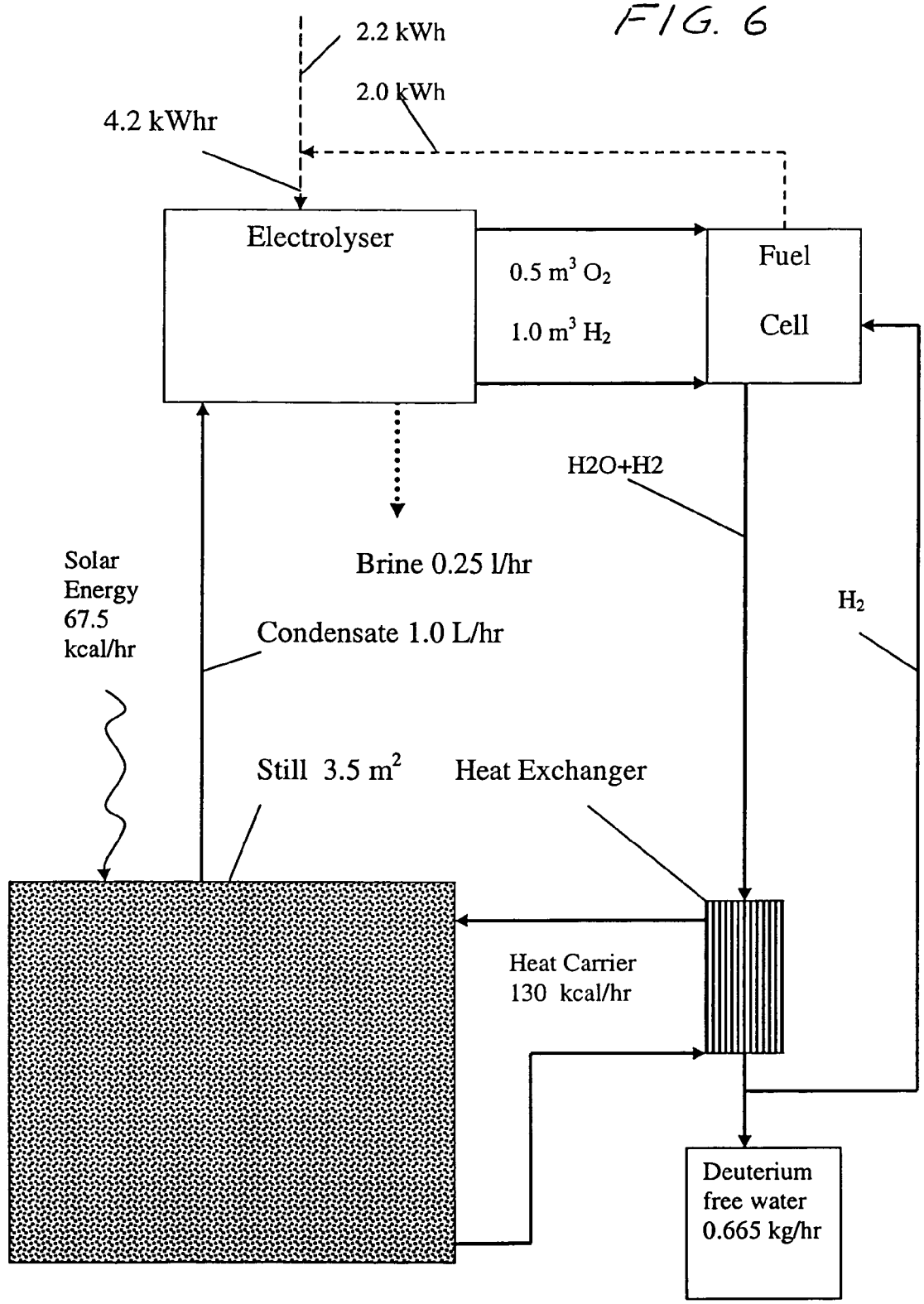
FIG. 6 is a drawing showing a mass and energy balance.

A second preferred embodiment of the present invention is a ground based plant as shown in FIG. 5. Ground placement of the plant includes the flat black pan 40 which can be made from any sloped plastic or metallic material with metallic tubes 42 inside the pan. Arrow 44 shows the direction of the heat carrier. Sea water is added on the black sloped surface by pump 18A and water is circulated in a loop consisting of tank 12A black pan 40 and pump 18A. The roof 14A can be made from polymer material or glass and it has a slope. The condensate flows down into distillate trough 44. An insulation layer 46 is placed under tubes 42. The entire unit is placed on concrete pad 48. Other parts of the system are the same as it was described above.

EXAMPLES

A preferred example is a system that produces 1 kg condensate/hr by evaporation. Percentage of the condensate volume used for electrolysis (PE) should be no more than 80%. Parameters of the system and operating parameters are outlined below:

1. If PE=75% than from 1 kg of a condensate we will use 0.75 kg and 0.25 kg will be in the brine. The splitting reaction is $H_2O = H_2 + 1/2 O_2$. From 0.75 kg of water is produced 1 m$^3$ $H_2$ and 0.5 m$^3$ $O_2$.
2. Efficiency of electrolysis is 4.2 kWh for production of 1 m$^3$ $H_2$.
3. Efficiency (Eff) of alkaline fuel cell is 60-70%. The efficiency for fuel cell is Eff=Vc/1.48, where Vc is the voltage on the fuel cell. For Eff=67.5% the Vc is 1.0V.
4. Electrical energy can be calculated from the formula:

$O_2$ usage=$25.28 \times 10^{-5} \times Pc/Vc$ ($Pc$-fuel cell energy),m$^3$/hr For 0.5 m$^3$ $O_2$ the Pc is 2 kWh. This is recovery energy which is used for electrolysis. So, the energy recovery is $(2/4.2) \times 100\% = 47.6\%$ Water production can be calculated from the formula:

H2O=$33.62 \times 10^{-5} \times Pc/Vc$ ($Pc$-fuel cell energy),kg/hr

For Pc=2 kW and Vc=1 V the water production is 0.665 kg/hr

Heating rate can be calculated from the formula:

Heat=$Pc(1.25/Vc-1)$,Watt

Heat=500 Watt

5. Taking into account average efficiency of heat exchangers to be about 65% the amount of heat which can be used for evaporation is 300 W or about 260 Kcal/hr. We assume about half of this heat will be lost. The resulting useful heat is about 130 Kcal/hr.
6. The average hourly solar radiation value for Texas or Arizona is 225 Kcal/m$^2$ hr. Only 30% of this heat can be used for heating of water –67.5 Kcal/m$^2$ hr.
7. The heat from fuel cell (130 Kcal/hr) will increase the evaporator temperature. We need to determine the heat transfer coefficient from heat carrier to upper surface for calculation this item.

The heat transfer coefficient is:

$K = [(1/\alpha_1) + (\Delta_1/\partial_1) + (\Delta_2/\partial_2) + (1/\alpha_2)]^{-1}$, where $\alpha_1$—heat-transferring coefficient from heat-carrier to tube, (300 wt/m$^2$K)

$\Delta_1$—heat-conducting coefficient of the metallic tube (384 wt/m K)

$\partial_1$—the thickness of metallic tube wall (0.001 m)

$\Delta_2$—heat-conducting coefficient of the polymeric material (0.2 wt/m K)

$\partial_2$—the thickness of polymeric material (0.003 m)

$\alpha_2$—heat-transferring coefficient from polymer material to air (about 10 wt/m$^2$K)

The increasing of surface temperature of evaporator is:

$\Delta t = Q/KF$, where F is the surface area, m$^2$; Q is the heat from fuel cell, wt For F=1 m$^2$ the increase in surface temperature is $\Delta t = 130/8.45 = 15.3°$ C.

8. The average temperature of surface is about 40° C. and productivity is about 2.0 liters/m$^2$ day, than the increase in temperature for 15 degrees should raise the evaporation rate. The evaporation rate is $$G = 0.978 \times \omega^{0.8} \times (Ps-P),$$

where G—evaporation rate of water from 1 m², kg/m² hr
Ω—speed of air flow above the surface (0.05 m/s for convection)
Ps—pressure of saturated water vapor for surface temperature, mm Hg
P—pressure of water vapor above the surface, mm Hg
For t=40° C. the evaporation rate is 2.0 l/m² day. The increase of temperature from 40 to 55° C. will result in increasing of the evaporation rate from 2.0 liters/m² day to 7.6 liters/m² day.

9. For evaporation rate 1 kg condensate/hr (look item 1) we need the surface about 3.5 m².

While the above specification describes in detail preferred embodiments of the present invention, persons skilled in this art will recognize that many additions and variations to the above described embodiments are possible. For example scaled down versions of the described systems will be especially useful for water supply for large ships, small boats, oil drilling platforms, beach cottages and other such applications where fresh water supply is limited. The systems can also be expanded to any size for supply of low deuterium water for large urban areas. Recognizing the potential health benefits of the low deuterium water, the present invention would be useful even in locations where plenty of fresh standard drinking water is available. Therefore, the reader should determine the scope of the present invention by the appended claims and their legal equivalents.

I claim:

1. A plant for producing low-deuterium water from seawater comprising:
   A) a solar still comprising:
      1) a black pan for absorbing radiation from the sun and transferring resulting solar heat energy to seawater to evaporate the seawater to produce water vapor,
      2) a condensate tank,
      3) a porous membrane, defining an upper side and a lower side, and positioned above said black pan for condensing said water vapor into a condensate,
         a) comprising diffusing pores permitting said condensate to diffuse from said lower side to said upper side, and
         b) being positioned in a slope to permit said condensate on said upper side to drain into said condensate tank, and
   B) a water treatment unit for reducing deuterium concentration in said condensate comprising:
      1) a water filter to produce filtered condensate,
      2) an electrolyzer for separating a portion of said filtered condensate into hydrogen and oxygen,
      3) a reactor for combining at least a portion of said hydrogen and oxygen to produce heat and water having deuterium concentrations at least 50 percent lower than deuterium concentration in natural seawater, and
      4) a heat transfer system to transfer heat energy produced in said reactor to said reactor to provide heat energy to supplement said solar heat energy.

2. The plant as in claim 1 wherein said black pan is positioned on the sea and said black pan is a porous black pan having pores to permit seawater to diffuse to a top surface of said black pan.

3. The plant as in claim 2 wherein said black pan is comprised of a polymer micro-porous hydrophilic material.

4. The plant as in claim 3 wherein said hydrophilic material has an average pore size in the range of 7 to 150 microns and void volumes of 35 to 50 percent.

5. The plant as in claim 1 wherein said reactor is a fuel cell.

6. The plant as in claim 1 wherein said solar still also comprises a roof comprised of material substantially transparent to solar radiation.

7. The plant as in claim 1 wherein said solar still is floating on salt water.

8. The plant as in claim 1 wherein said solar still is located on land.

9. A process for producing low deuterium drinking water comprising the steps of:
   A) evaporating salt water in a solar still comprising:
      1) a black pan for absorbing radiation from the sun and transferring resulting solar heat energy to seawater to evaporate the seawater to produce water vapor,
      2) a condensate tank,
      3) a porous membrane, defining an upper side and a lower side, and positioned above said black pan,
         c) a) comprising diffusing pores permitting said condensate to diffuse from said lower side to said upper side, and
         d) b) being positioned in a slope to permit said compensate on said upper side to drain into said condensate tank, and
   B) treating the condensate produced in said solar still to reduce deuterium concentration in said condensate comprising the steps of:
      1) filtering water to produce filtered condensate,
      2) separating a portion of said filtered condensate into hydrogen and oxygen using an electrolyzer,
      3) combining in a reactor at least a portion of said hydrogen and oxygen to produce heat energy and water having deuterium concentrations at least 50 percent lower than deuterium concentration in natural seawater, and
      4) transferring with a heat transfer system heat energy produced in said reactor to provide heat energy to supplement said solar heat energy.

10. The process as in claim 9 and further comprising a step of selling said low deuterium water as drinking water.

* * * * *